(12) United States Patent
Kono et al.

(10) Patent No.: US 8,674,631 B2
(45) Date of Patent: Mar. 18, 2014

(54) POWER CONVERSION APPARATUS AND METHOD OF CONTROLLING CAPACITOR VOLTAGE OF POWER CONVERSION APPARATUS

(75) Inventors: Masaki Kono, Tokyo (JP); Keita Hatanaka, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 98 days.

(21) Appl. No.: 13/259,613

(22) PCT Filed: May 13, 2009

(86) PCT No.: PCT/JP2009/058928
§ 371 (c)(1),
(2), (4) Date: Sep. 23, 2011

(87) PCT Pub. No.: WO2010/131344
PCT Pub. Date: Nov. 18, 2010

(65) Prior Publication Data
US 2012/0019178 A1      Jan. 26, 2012

(51) Int. Cl.
*H02P 27/00*      (2006.01)

(52) U.S. Cl.
USPC ........ 318/130; 318/400.3; 318/507; 318/139; 318/801; 318/815; 361/16; 361/98; 361/58; 361/59; 361/75; 307/9.1; 307/128; 307/45; 307/127; 307/401; 363/56.01; 363/131; 363/63; 187/290; 187/293; 187/296; 320/127; 320/166; 323/239; 323/282; 323/286; 323/289

(58) Field of Classification Search
USPC ......... 318/130, 507, 400.3, 139, 400.14, 492; 307/48, 401, 45, 46; 320/127, 166; 361/212, 11; 323/239, 282, 286, 289; 187/296, 290, 293
See application file for complete search history.

(56) References Cited

U.S. PATENT DOCUMENTS 5,563,479 A * 10/1996 Suzuki .......................... 318/139
8,140,205 B2     3/2012 Hanyu et al.
(Continued)

FOREIGN PATENT DOCUMENTS

CN      101374709 A      2/2009
JP      64-060266 A      3/1989
(Continued)

OTHER PUBLICATIONS

*International Search Report (PCT/ISA/210) issued on Aug. 18, 2009, by Japanese Patent Office as the International Searching Authority for International Application No. PCT/JP2009/058928.
(Continued)

*Primary Examiner* — Eduardo Colon Santana
*Assistant Examiner* — Jorge Carrasquillo
(74) *Attorney, Agent, or Firm* — Buchanan Ingersoll & Rooney PC

(57) ABSTRACT

A power conversion apparatus includes: a line breaker that is connected in series to a direct-current power supply; a first capacitor that is connected in parallel to the direct-current power supply through the line breaker; a discharge circuit that includes a resistor and a first switching circuit connected in series and is connected in parallel to the first capacitor; a power converter for driving a synchronous machine; a second capacitor that is connected in parallel to a direct-current side of the power converter; a second switching circuit that is connected in series between the first capacitor and the second capacitor; and a control circuit for controlling the discharge circuit. The control circuit controls the discharge circuit on the basis of the voltage of the first capacitor and the voltage of the second capacitor.

8 Claims, 3 Drawing Sheets

(56) References Cited

U.S. PATENT DOCUMENTS

2007/0137945 A1* 6/2007 Takasaki et al. .............. 187/290
2008/0306643 A1   12/2008 Hanyu et al.
2009/0086519 A1*  4/2009 Sadakata et al. ............. 363/131

FOREIGN PATENT DOCUMENTS

| JP | 8-019266 A | | 1/1996 |
| JP | 2000-308388 A | | 11/2000 |
| JP | 2004-357412 A | | 12/2004 |
| JP | 2004357412 A | * | 12/2004 |

OTHER PUBLICATIONS

*Written Opinion (PCT/ISA/237) issued on Aug. 18, 2009, by Japanese Patent Office as the International Searching Authority for International Application No. PCT/JP2009/058928 (in Japanese).

Office Action from Australian Patent Office (IP Australia) dated Apr. 22, 2013, issued in corresponding Australian Patent Application No. 2009346120.

Office Action from Chinese Patent Office dated Oct. 30, 2013, issued in corresponding Chinese Patent Application No. 200980159240.3, with English translation thereof. (20 pages).

* cited by examiner ic trains have a characteristic operation mode of running on inertia (coasting) without acceleration or deceleration of a drive system. A drive system using a synchronous machine generates a no-load induced voltage during such coasting. The no-load induced voltage is full-wave rectified through diodes which are connected in anti-parallel to switching circuits that constitute a power conversion apparatus. This increases the direct-current voltage (voltage across the terminals of a capacitor) to regenerate power on the power supply side, and the drive system makes a braking operation as a whole.

POWER CONVERSION APPARATUS AND METHOD OF CONTROLLING CAPACITOR VOLTAGE OF POWER CONVERSION APPARATUS

FIELD

The present invention relates to a power conversion apparatus and a method of controlling a capacitor voltage of a power conversion apparatus. In particular, the present invention relates to a power conversion apparatus and a method of controlling a capacitor voltage of the power conversion apparatus which can deal with a situation where the no-load induced voltage of a synchronous machine under high speed rotation is higher than the direct-current power supply voltage.

BACKGROUND

Automobiles and electric trains have a characteristic operation mode of running on inertia (coasting) without acceleration or deceleration of a drive system. A drive system using a synchronous machine generates a no-load induced voltage during such coasting. The no-load induced voltage is full-wave rectified through diodes which are connected in anti-parallel to switching circuits that constitute a power conversion apparatus. This increases the direct-current voltage (voltage across the terminals of a capacitor) to regenerate power on the power supply side, and the drive system makes a braking operation as a whole.

As a related technology, Patent Literature 1 listed below discloses a drive unit of a permanent magnet motor for an electric car. The drive unit includes a parallel connection circuit of one-way conducting means and open-close means, inserted in series between the power supply of an inverter and an inverter arm, and drives a permanent magnet synchronous motor through the inverter. When the inverter is not in operation, the open-close means is open. To start up the inverter, the open-close means is kept open while an exciting current is controlled so as to set the terminal voltage of the motor to a predetermined value. When the terminal voltage of the motor reaches the predetermined value, the open-close means is closed and a torque current of the motor is controlled to operate the motor for acceleration or deceleration. To stop the inverter in operation, the exciting current is controlled so as to set the terminal voltage of the motor to a predetermined value while the torque current is reduced to zero. The open-close means is then opened before the exciting current is reduced to stop the operation of the inverter. The technology disclosed in Patent Literature 1 takes account of countermeasures against overvoltage on the capacitor on the power supply side.

Citation List

Patent Literature

Patent Literature 1: Japanese Patent Application Laid-open No. 2000-308388

SUMMARY

Technical Problem

Patent Literature 1 states that sufficient measures for the capacitors on the inverter-arm side can be taken by appropriately selecting the voltage ratings of semiconductor devices such as an IGBT and the capacitors on the inverter-arm side. However, even if the voltage ratings of the semiconductor devices such as an IGBT and the capacitors on the inverter-arm side are appropriately selected, the no-load induced voltage can sometimes rise further to give an overvoltage to the capacitors on the inverter-arm side, in which case the inverter is forced to be stopped. To discharge the capacitors on the inverter-arm side, the capacitors on the inverter-arm side need to be accompanied by discharge circuits. There has thus been a problem that the power conversion apparatus becomes unnecessarily large in size and high in cost.

The present invention has been achieved in view of the foregoing, and it is an object thereof to provide a power conversion apparatus and a method of controlling a capacitor voltage of the power conversion apparatus which can eliminate the need to provide the capacitors with respective discharge circuits.

Solution to Problem

In order to solve the aforementioned problems and attain the aforementioned object, the power conversion apparatus is provided with: a line breaker that is connected in series to a direct-current power supply; a first capacitor that is connected in parallel to the direct-current power supply through the line breaker; a discharge circuit that is connected in parallel to the first capacitor, and includes a resistor and a first switching circuit which are connected in series; a power converter for driving a synchronous machine; a second capacitor that is connected in parallel to a direct-current side of the power converter; a second switching circuit that is connected in series between the first capacitor and the second capacitor; and a control circuit for controlling the discharge circuit, a first voltage detector for detecting a voltage of the first capacitor, and a second voltage detector for detecting a voltage of the second capacitor, the control circuit controlling the discharge circuit on the basis of the voltage of the first capacitor and the voltage of the second capacitor.

Advantageous Effects of Invention

According to the present invention, it is possible to eliminate the need to provide the capacitors with respective discharge circuits. More specifically, the first capacitor connected in parallel to the direct-current power supply and the second capacitor connected in parallel to the direct-current side of the power converter can be discharged by a single discharge circuit. This has the effect that it is possible to miniaturize the power conversion apparatus and achieve cost savings through a reduction in parts count.

REFERENCE SIGNS LIST

1 DIRECT-CURRENT POWER SUPPLY
2 LINE BREAKER
3 RESISTOR
4, 8 SWITCHING CIRCUIT
5 DISCHARGE CIRCUIT
6, 9 CAPACITOR
7, 10 VOLTAGE DETECTOR
11, 15 CONTROL CIRCUIT
12 POWER CONVERTER
13 SYNCHRONOUS MACHINE
14 CURRENT DETECTOR
16$a$, 16$b$, 16$c$, 16$d$ COMPARATOR
17$a$, 17$b$ INVERTING (NOT) UNIT
18 HOLDING (LATCH) UNIT
19$a$, 19$b$, 19$b$ LOGICAL PRODUCT (AND) UNIT
20$a$, 20$b$ TIME LIMIT RELAY

DESCRIPTION OF EMBODIMENTS

Hereinafter, embodiments of the power conversion apparatus according to the present invention will be described in detail with reference to the drawings. It should be noted that the present invention is not limited by these embodiments.

First Embodiment

Figure 1:
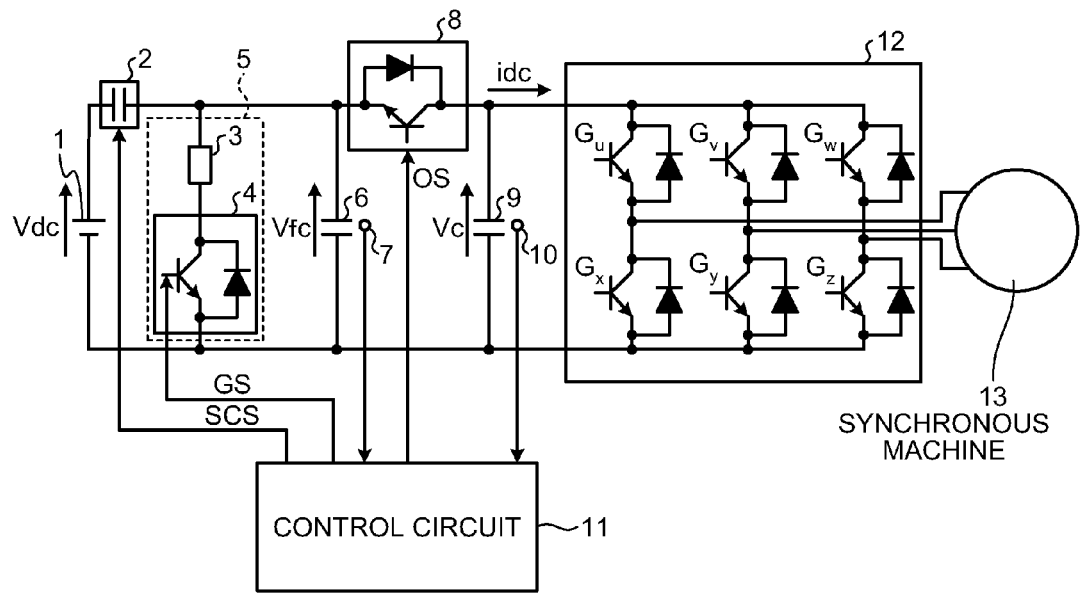
FIG. 1 is a diagram showing the configuration of a power conversion apparatus according to a first embodiment of the present invention.

FIG. 1 is a diagram showing the configuration of a power conversion apparatus according to a first embodiment of the present invention. The power conversion apparatus according to the present embodiment includes: a line breaker 2 which is connected in series to a direct-current power supply 1; a first capacitor 6 which is connected in parallel to the direct-current power supply 1 through the line breaker 2; a resistor 3 and a first switching circuit 4 which are connected in series to each other and are connected in parallel to the capacitor 6 for overvoltage suppression; a power converter 12 which drives a synchronous machine 13; a second capacitor 9 which is connected in parallel to the direct-current side of the power converter 12; a second switching circuit 8 which is connected in series between the capacitor 9 and the capacitor 6; a first voltage detector 7 which detects the voltage of the capacitor 6; a second voltage detector which detects the voltage of the capacitor 9; and a control circuit 11 which controls the switching circuit 4, the switching circuit 8, and the line breaker 2. The resistor 3 and the switching circuit 4 constitute a discharge circuit 5.

In the first embodiment, the synchronous machine 13 is a permanent magnet synchronous machine which uses magnetic fluxes occurring from a permanent magnet attached to its rotor. In the permanent magnet synchronous machine, the magnetic fluxes occurring from the permanent magnet are constant. The synchronous machine 13 by itself characteristically generates an induced voltage that is in proportion to the product of the magnetic flux density of the permanent magnet and the rotation speed of the synchronous machine 13. The induced voltage is typically called a no-load induced voltage. Meanwhile, the power converter 12 cannot generate a voltage higher than or equal to the direct-current voltage of the input direct-current power supply 1. In a domain where the no-load induced voltage exceeds the maximum output voltage of the power converter 12, the power converter 12 therefore performs a so-called field weakening control so that the armature windings produce magnetic fluxes that cancel those of the permanent magnet, before reaching high rotation speed.

In general, electric vehicles such as automobiles and electric trains are characterized by having an operation mode of running on inertia, or coasting, with the power converter stopped, other than power running or regeneration. When an electric vehicle with a permanent magnet synchronous machine coasts, there occurs the foregoing no-load induced voltage.

When the power conversion apparatus according to the first embodiment shown in FIG. 1 is in a domain where the no-load induced voltage occurring in the synchronous machine 13 is higher than the direct-current voltage of the power converter 12 (equivalent to the voltage across the capacitor 6), the no-load induced voltage occurring in the synchronous machine 13 is full-wave rectified through the diodes of switching circuits Gu, Gv, Gw, Gx, Gy, and Gz that constitute the power converter 12. This increases the direct-current voltage to regenerate power on the side of the direct-current power supply 1, and the system produces braking force for a braking operation as a whole.

The operation of the power conversion apparatus to pass exciting currents for field weakening control while the electric vehicle is coasting is undesirable in terms of energy saving because of copper loss occurring from the passing of the currents through the windings of the permanent magnet synchronous machine and the occurrence of loss in the power converter 12. This is a significant problem particularly to electric automobiles since the most important challenge is the energy efficiency.

Then, in the first embodiment, as shown in FIG. 1, the switching circuit 8 is inserted in series between the power converter 12 and the capacitor 6, and the synchronous machine 13 is driven through the power converter 12. In the first embodiment, the switching circuit 8 may be configured to include an open-close circuit such as an IGBT or other transistor to which a diode or other one-way conducting circuit is connected in antiparallel. The same circuit as the switching circuits Gu, Gv, Gw, Gx, Gy, and Gz constituting the power converter 12 may be used. Like the switching circuit 8, the switching circuit 4 may also be configured to include an open-close circuit such as an IGBT or other transistor to which a diode or other one-way conducting circuit is connected in antiparallel. The same circuit as the switching circuits Gu, Gv, Gw, Gx, Gy, and Gz constituting the power converter 12 may be used.

The control circuit 11 accepts the voltage value of the capacitor 9 detected by a voltage detector 10 and the voltage value of the capacitor 6 detected by the voltage detector 7 as its inputs, and controls the line breaker 2, the switching circuit 4, and the switching circuit 8.

When the power converter 12 makes an accelerating operation, the control circuit 11 controls the transistor of the switching circuit 8 to be turned ON so that power is supplied from the direct-current power supply 1 to the power converter 12.

When the power converter 12 stops operation, the control circuit 11 controls the transistor of the switching circuit 8 to be turned OFF. Here, if the no-load induced voltage occurring in the synchronous machine 13 is higher than the voltage of the capacitor 9, the capacitor 9 is peak-charged through the diodes of the switching circuits Gu, Gv, Gw, Gx, Gy, and Gz constituting the power converter 12. The capacitance of the capacitor 9 can be appropriately selected so that the capacitor 9 is immediately charged up and the whole system will not make a braking operation.

When the transistor of the switching circuit 8 is OFF, the flow of power from the side of the power converter 12 to the side of the direct-current power supply 1 is interrupted by the switching circuit 8. This can prevent the occurrence of unnecessary braking force and accompanying power loss because the no-load induced voltage occurring in the synchronous machine 13 is regenerated on the side of the direct-current power supply 1 during coasting. It is also possible to prevent the voltage of the direct-current power supply 1 from rising to or above the normal voltage.

Figure 2:
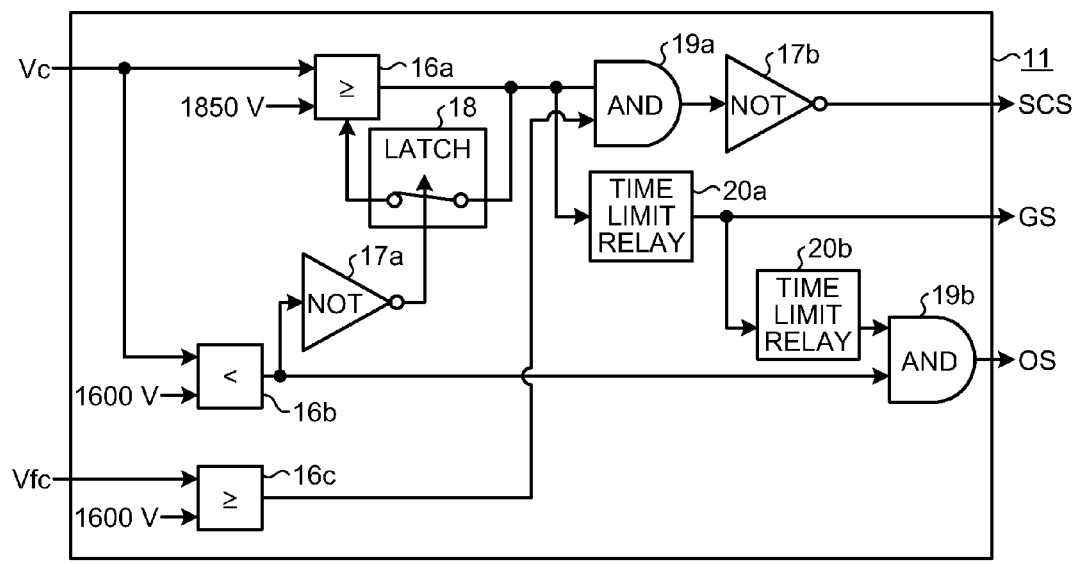
FIG. 2 is a diagram showing the configuration of a control circuit 11 of the power conversion apparatus according to the first embodiment of the present invention.

FIG. 2 shows an example of the configuration of the control circuit 11. The control circuit 11 accepts the voltage value Vc of the capacitor 9 and the voltage value Vfc of the capacitor 6 as its inputs, and outputs signals for controlling the switching circuit 8, the switching circuit 4 which constitutes the discharge circuit 5, and the line breaker 2 according to the voltage value Vc of the capacitor 9 and the voltage value Vfc of the capacitor 6.

As shown in FIG. 2, a comparator 16a compares the voltage value Vc of the capacitor 9 with a predetermined threshold (here, which shall be 1850 V by way of example) that represents the overvoltage setting. If the voltage value Vc of the capacitor 9 is greater than or equal to the predetermined threshold (here, 1850 V) which represents the overvoltage setting, the comparator 16a outputs a value (logic value) of "1." The value "1" output from the comparator 16a is input to a logical product (AND) unit 19a. Note that the output signal of the logical product (AND) unit 19a is maintained at the value of "1" by a holding (latch) unit 18. That is, the holding (latch) unit 18 is configured to hold the output value "1" of the comparator 16a. The holding condition is determined by an inverting (NOT) unit 17a and a comparator 16b. The voltage value Vc of the capacitor 9 is input to the comparator 16b. The voltage value Vc of the capacitor 9 is compared with a predetermined threshold (here, which shall be 1600 V by way of example), and the comparator 16b outputs a value "1" if the voltage value Vc of the capacitor 9 falls below the predetermined threshold (here, 1600 V). The output of the comparator 16b is input to and inverted by the inverting (NOT) unit 17a. That is, when the value "1" is input to the inverting (NOT) unit 17a, a value "0" is output from the inverting (NOT) unit 17a. If the output of the inverting (NOT) unit 17a is "0," the holding (latch) unit 18 continues holding the output "1" of the comparator 16a. If the voltage value Vc of the capacitor 9 exceeds or is equal to the predetermined threshold (here, 1600 V), the output of the comparator 16b becomes "0" and the output of the inverting (NOT) unit 17a becomes "1." Consequently, the holding (latch) unit 18 releases the holding state and changes the value of the comparator 16a from "1" to "0." In short, once the voltage Vc of the capacitor 9 reaches 1850 V, a control signal SCS (to be described later) for controlling the line breaker 2 is "0" until the capacitor 9 is discharged down to 1600 V.

The voltage value Vfc of the capacitor 6 is input to a comparator 16c. The voltage value Vfc of the capacitor 6 is compared with a predetermined threshold (here, which shall be 1600 V by way of example). The comparator 16c outputs a value "1" if the voltage value Vfc of the capacitor 6 is greater than or equal to the predetermined threshold (here, 1600 V). The value "1" output from the comparator 16c is input to the logical product (AND) unit 19a.

The logical product (AND) unit 19a outputs a signal "1" if both the value output from the comparator 16a and the value output from the comparator 16c are "1." In other cases, the logical product (AND) unit 19a outputs a signal "0."

The output signal of the logical product (AND) unit 19a is input to an inverting (NOT) unit 17b. The output signal of the inverting (NOT) unit 17b becomes an ON (when the output of the inverting (NOT) unit 17b is "1")/OFF (when the output of the inverting (NOT) unit 17b is "0") control signal SCS for controlling the line breaker 2.

The output signal of the comparator 16a is passed through a time limit relay 20a and becomes an ON (when the output of the time limit relay 20a is "1")/OFF (when the output of the time limit relay 20a is "0") control signal GS for the switching circuit 4. The time limit relay 20a is intended to delay the timing of the input signal by a certain predetermined time (delay time) for output. The effect is to prevent the switching circuit 4 from turning ON (passing a through current) before the line breaker 2 is opened (OFF). The delay time of the time limit relay 20a is thus set in consideration of the time for the line breaker 2 to open (set to as long a period as time t1 to t2 of FIG. 3 to be described later (for example, 100 msec or so)).

The output signal of the time limit relay 20a is further input to a time limit relay 20b. The output signal of the time limit relay 20b is input to a logical product (AND) unit 19b along with the output signal of the comparator 16b. The output of the logical product (AND) unit 19b becomes an ON (when the output of the logical product (AND) unit 19b is "1")/OFF (when the output of the logical product (AND) unit 19b is "0") control signal OS for the switching circuit 8. Inputting the output signal of the time limit relay 20a further into the time limit relay 20b to make the ON timing of the switching circuit 8 lag behind that of the switching circuit 4 has the effect that it is possible to prevent a large current from flowing through the switching circuit 8 and avoid breakdown of the switching circuit 8.

The first embodiment takes account of the situation where the voltage of the capacitor 9 in such a circuit configuration rises to a high voltage (overvoltage) beyond expectation (such as beyond an expected threshold). As mentioned previously, the no-load induced voltage occurring in the synchronous machine 13 is higher than the voltage of the direct-current power supply 1. Depending on the control method and other factors, the voltage of the capacitor 9 can sometimes be unexpectedly high. The method for controlling the voltage of the capacitor 9 (discharging the electric charge) is thus important.

Next, the operation of the first embodiment will be described with reference to FIG. 3.

Figure 3:
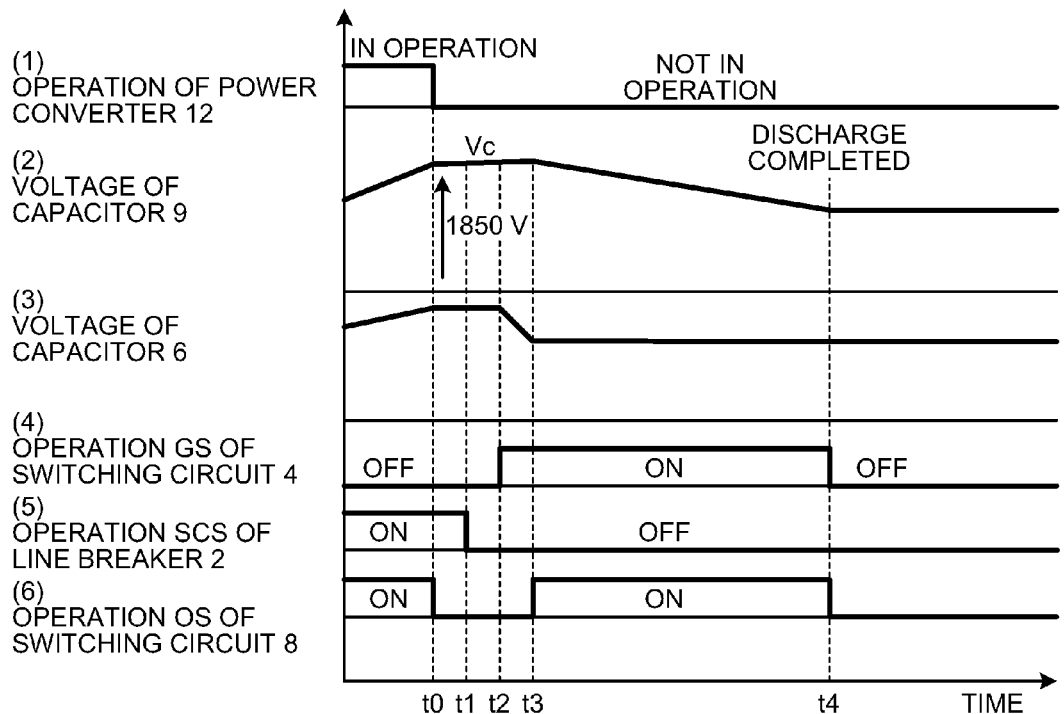
FIG. 3 is a waveform chart showing the operation of essential parts of the power conversion apparatus according to the first embodiment of the present invention.

At time t0 of FIG. 3, when the voltage of the capacitor 9 which can be detected by the voltage detector 10 rises to an overvoltage due to any reason, the power converter 12 stops operation and the control circuit 11 controls the transistor of the switching circuit 8 to be turned OFF.

Suppose that after the transistor of the switching circuit 8 is controlled to be turned OFF, the transistor of the switching circuit 8 is turned ON again with a potential difference between the voltage of the capacitor 9 and that of the capacitor 6. Since the switching circuit 8 has a low impedance, a large short-circuit current can flow through the switching circuit 8 to destroy the switching circuit 8. To avoid this, in the first embodiment, as will be described, the control circuit 11 controls the transistor of the switching circuit 4 to be turned ON before controlling the transistor of the switching circuit 8 to be turned ON again.

At time t1, the control circuit 11 controls the line breaker 2 to be turned OFF so that the power will not be regenerated on the side of the direct-current power supply 1.

At time t2, the control circuit 11 controls the transistor of the switching circuit 4 to be turned ON. Consequently, the electric charge of the capacitor 6 is discharged to lower the voltage of the capacitor 6 which is detected by the voltage detector 7.

At time t3, the control circuit 11 controls the transistor of the switching circuit 8 to be turned ON while the transistor of the switching circuit 4 is kept turned ON. As a result, the electric charge of the capacitor 9 is discharged. Since the potential difference between the voltage of the capacitor 9 and that of the capacitor 6 is reduced before the transistor of the switching circuit 8 is controlled to be turned ON, it is possible to prevent a large short-circuit current from flowing through the switching circuit 8 and avoid breakdown of the switching circuit 8. In the first embodiment, the electric charges of the two capacitors 9 and 6 can be discharged by the single discharge circuit 5 as described above.

At time t4, the electric charge of the capacitor 9 is discharged and the voltage of the capacitor 9 is lowered to one that allows the activation of the power converter 12. The control circuit 11 controls the transistor of the switching circuit 4 to be turned OFF. At the same time, the control circuit 11 also controls the transistor of the switching circuit 8 to be turned OFF. The foregoing control of the control circuit 11 can prevent the no-load induced voltage occurring in the synchronous machine 13 from flowing into (being applied to) the direct-current power supply 1 and the capacitor 6.

As has been described above, in the first embodiment, it is possible to eliminate the need to provide the capacitor 9 and the capacitor 6 with respective discharge circuits. That is, the capacitor 9 and the capacitor 6 can be discharged by the single discharge circuit 5. This has the effect that it is possible to miniaturize the power conversion apparatus and achieve cost savings through a reduction in parts count.

Second Embodiment

Figure 4:
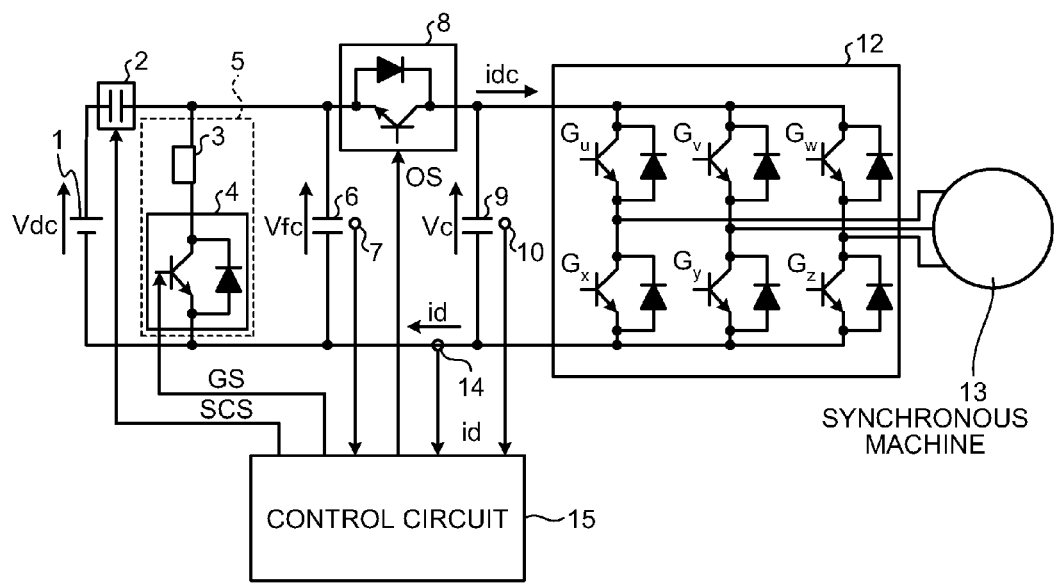
FIG. 4 is a diagram showing the configuration of a power conversion apparatus according to a second embodiment of the present invention.

Next, a second embodiment of the present invention will be described. FIG. 4 is a diagram showing the configuration of a power conversion apparatus according to the second embodiment of the present invention.

The same parts as in the first embodiment will be designated by like reference signs, and a description thereof will be omitted. The following description will deal only with differences.

As compared to the power conversion apparatus according to the first embodiment, the power conversion apparatus according to the second embodiment is characterized by further including a current detector 14 for detecting the current that flows through the switching circuit 8. Because of this, the power conversion apparatus according to the second embodiment includes a control circuit 15 instead of the control circuit 11 of the power conversion apparatus according to the first embodiment.

Figure 5:
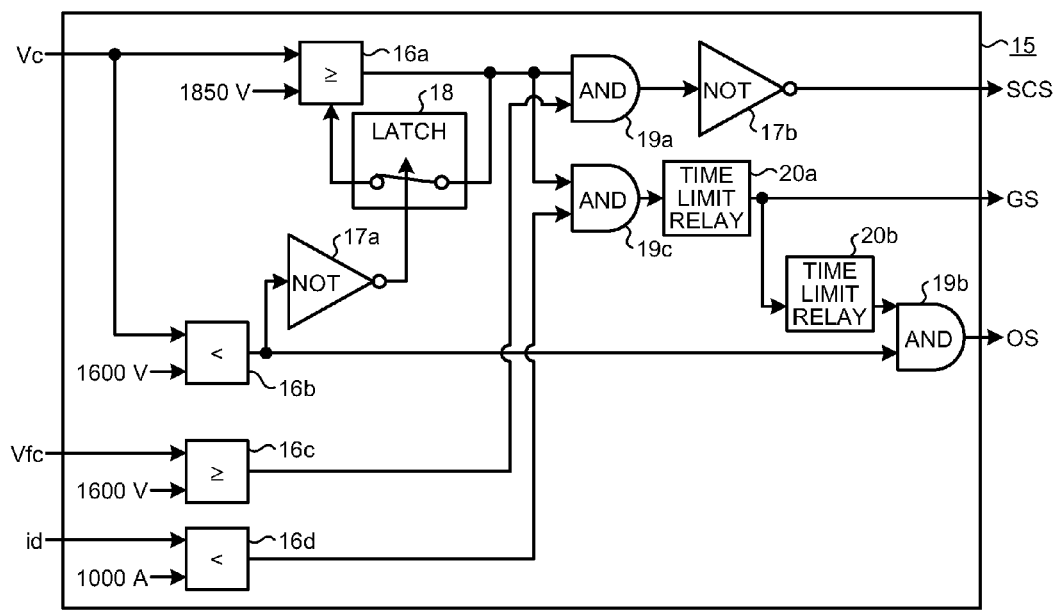
FIG. 5 is a diagram showing the configuration of a control circuit 15 of the power conversion apparatus according to the second embodiment of the present invention.

FIG. 5 shows an example of the configuration of the control circuit 15. As compared to the control circuit 11 of the first embodiment, a comparator 16d and a logical product (AND) unit 19c are added so that a current id that is detected by the current detector 14 for detecting the current flowing through the switching circuit 8 is accepted as an input, and the switching circuit 8 and the switching circuit 4 are turned ON only if id is smaller than a predetermined threshold (here, which shall be 1000 A by way of example). Consequently, when the value of the current flowing through the switching circuit 8 exceeds or is equal to the predetermined threshold (here, 1000 A), the control circuit 15 can control the transistor of the switching circuit 8 and the transistor of the switching circuit 4 to be turned OFF.

Next, the operation of the second embodiment will be described with reference to FIG. 6. Up to time t3 of FIG. 6, the operation of the second embodiment is the same as that of the first embodiment described previously. A description thereof will thus be omitted.

Figure 6:
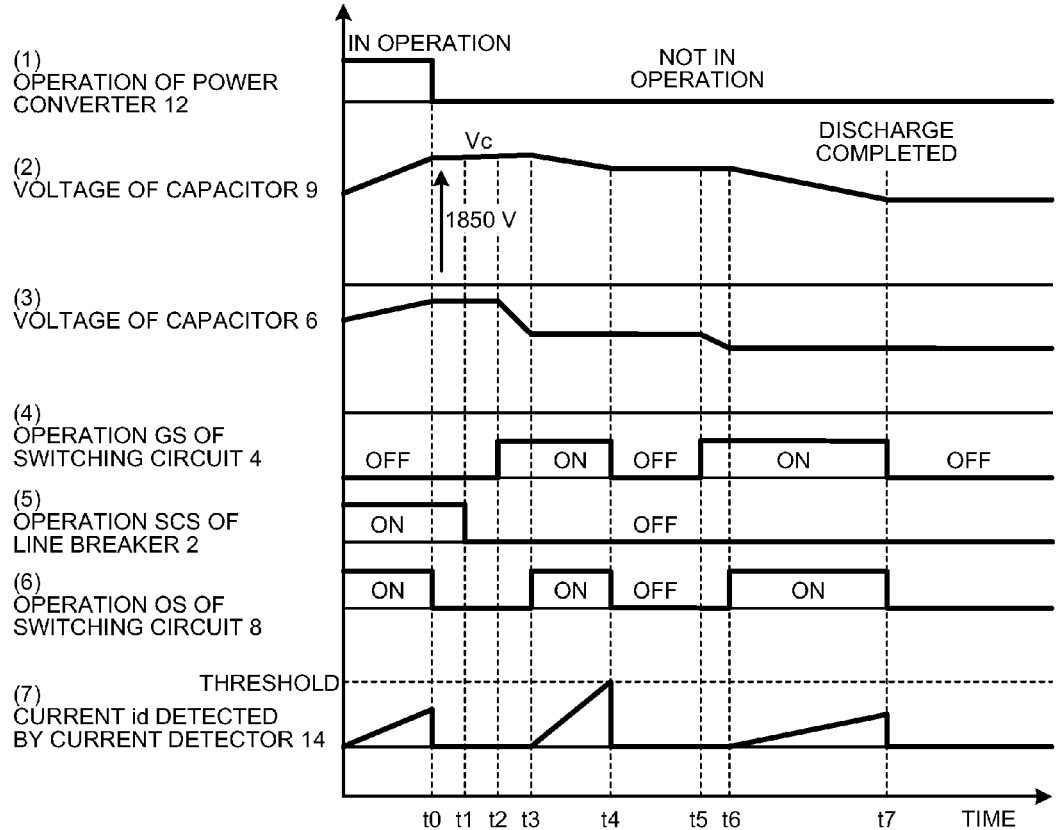
FIG. 6 is a waveform chart showing the operation of essential parts of the power conversion apparatus according to the second embodiment of the present invention.

At time t4 of FIG. 6, when the value of the current flowing through the switching circuit 8, detected by the current detector 14, exceeds the predetermined threshold, the control circuit 15 controls the transistor of the switching circuit 8 and the transistor of the switching circuit 4 to be turned OFF. This has the effect that it is possible to prevent the switching circuit 8 from being broken by an overcurrent. Turning OFF the transistor of the switching circuit 4 along with the transistor of the switching circuit 8 can prevent the voltage of the capacitor 6 from dropping, thereby minimizing the potential difference between the voltage of the capacitor 9 and that of the capacitor 6 when the transistor of the switching circuit 8 is turned ON next time. This has the effect that it is possible to prevent a large current from flowing because of the potential difference between the voltage of the capacitor 9 and that of the capacitor 6. One of the possible factors for a large current to flow through the switching circuit 8 as at time t4 is that the switching circuit 8 is turned ON without the switching circuit 4 ON (with the switching circuit 4 OFF).

Subsequently, at time t5, the control circuit 15 controls the transistor of the switching circuit 4 to be turned ON again in order to discharge the electric charge of the capacitor 9. Then, at time t6, the control circuit 15 immediately controls the transistor of the switching circuit 8 to be turned ON to discharge the electric charge of the capacitor 9.

Since the transistor of the switching circuit 8 is controlled to be turned ON to discharge the electric charge of the capacitor 9 at time t6, the voltage of the capacitor 9 falls to one that allows the activation of the power converter 12 at time t7. The control circuit 15 controls the transistor of the switching circuit 4 to be turned OFF. At the same time, the control circuit 15 also controls the transistor of the switching circuit 8 to be turned OFF. The foregoing control of the control circuit 15 can prevent the no-load induced voltage occurring in the synchronous machine 13 from flowing into (being applied to) the direct-current power supply 1 or the capacitor 6.

As has been described above, in the second embodiment, it is possible to eliminate the need to provide the capacitor 9 and the capacitor 6 with respective discharge circuits. That is, the capacitor 9 and the capacitor 6 can be discharged by the single discharge circuit 5. This has the effect that it is possible to miniaturize the power conversion apparatus and achieve cost savings through a reduction in parts count.

It is also possible to prevent the switching circuit 8 from being broken when the switching circuit 8 is turned ON in an attempt to make a discharge in cases such as a failure of the switching circuit 4. This has the effect that it is possible to improve the reliability of the switching circuit 8.

INDUSTRIAL APPLICABILITY

As has been described above, the power conversion apparatus according to the present invention is useful for a power conversion apparatus and a method of controlling a capacitor voltage of a power conversion apparatus. In particular, the power conversion apparatus according to the present invention is suitable for a power conversion apparatus and a method of controlling a capacitor voltage of the power conversion apparatus which can deal with a situation where the no-load induced voltage of a synchronous machine under high speed rotation is higher than the direct-current power supply voltage.

The invention claimed is:

1. A power conversion apparatus comprising:
a line breaker that is connected in series to a direct-current power supply;
a first capacitor that is connected in parallel to the direct-current power supply through the line breaker;
a discharge circuit that is connected in parallel to the first capacitor, and includes a resistor and a first switching circuit which are connected in series;
a power converter for driving a synchronous machine;
a second capacitor that is connected in parallel to a direct-current side of the power converter;
a second switching circuit that is connected in series between the first capacitor and the second capacitor; and
a control circuit for controlling the discharge circuit,
the power conversion apparatus further comprising
a first voltage detector for detecting a voltage of the first capacitor, and
a second voltage detector for detecting a voltage of the second capacitor,
the control circuit controlling the discharge circuit on the basis of the voltage of the first capacitor and the voltage of the second capacitor,
wherein the control circuit, when discharging the second capacitor, controls the line breaker to be turned OFF and controls the first switching circuit to be turned ON to discharge the first capacitor before controlling the second switching circuit to be turned ON to discharge the second capacitor.

2. The power conversion apparatus according to claim 1, further comprising a current detector for detecting an electric current that flows through the second switching circuit, and wherein
the control circuit controls the second switching circuit to be turned OFF when the current flowing through the second switching circuit, detected by the current detector when discharging the second capacitor, exceeds a current threshold.

3. A power conversion apparatus comprising:
a line breaker that is connected in series to a direct-current power supply;
a first capacitor that is connected in parallel to the direct-current power supply through the line breaker;
a discharge circuit that is connected in parallel to the first capacitor, and includes a resistor and a first switching circuit which are connected in series;
a power converter for driving a synchronous machine;
a second capacitor that is connected in parallel to a direct-current side of the power converter;
a second switching circuit that is connected in series between the first capacitor and the second capacitor; and
a control circuit for controlling the discharge circuit,
the power conversion apparatus further comprising
a first voltage detector for detecting a voltage of the first capacitor, and
a second voltage detector for detecting a voltage of the second capacitor,
the control circuit controlling the discharge circuit on the basis of the voltage of the first capacitor and the voltage of the second capacitor,
wherein the control circuit controls the line breaker to be turned OFF when the voltage of the first capacitor becomes higher than or equal to a first voltage threshold and the voltage of the second capacitor becomes higher than or equal to a second voltage threshold, controls the first switching circuit to be turned ON to discharge the first capacitor after the line breaker is opened, and controls the second switching circuit to be turned ON to discharge the second capacitor when the voltage of the second capacitor becomes lower than a third voltage threshold after the first switching circuit is turned ON.

4. The power conversion apparatus according to claim 3, further comprising a current detector for detecting an electric current that flows through the second switching circuit, and wherein
the control circuit controls the second switching circuit to be turned OFF when the current flowing through the second switching circuit, detected by the current detector when discharging the second capacitor, exceeds a current threshold.

5. A method of controlling a capacitor voltage of a power conversion apparatus, the power conversion apparatus including a line breaker that is connected in series to a direct-current power supply, a first capacitor that is connected in parallel to the direct-current power supply through the line breaker, a discharge circuit that includes a resistor and a first switching circuit connected in series and is connected in parallel to the first capacitor, a power converter for driving a synchronous machine, a second capacitor that is connected in parallel to a direct-current side of the power converter, a second switching circuit that is connected in series between the first capacitor and the second capacitor, and a control circuit for controlling the first and second switching circuits and the line breaker, the method comprising:
a step of causing the control circuit to control the line breaker to be turned OFF;
a step of causing the control circuit to control the first switching circuit to be turned ON to discharge the first capacitor after the line breaker is opened; and
a step of causing the control circuit to control the second switching circuit to be turned ON, subsequent to turning ON the first switching circuit, to discharge the second capacitor when the voltage of the second capacitor falls below a third voltage threshold after the first switching circuit is turned ON,
wherein the control circuit controls the discharge circuit, the line breaker, and the second switching circuit on the basis of a voltage of the first capacitor and a voltage of the second capacitor.

6. The method of controlling a capacitor voltage of a power conversion apparatus according to claim 5, wherein
the step of causing the control circuit to control the line breaker to be turned OFF occurs when the voltage of the first capacitor becomes higher than or equal to a first voltage threshold and the voltage of the second capacitor becomes higher than or equal to a second voltage threshold.

7. The method of controlling a capacitor voltage of a power conversion apparatus according to claim 5, further comprising a step of causing the control circuit to control the second switching circuit to be turned OFF when a current, flowing through the second switching circuit when discharging the second capacitor, exceeds a current threshold.

8. The method of controlling a capacitor voltage of a power conversion apparatus according to claim 6, further comprising a step of causing the control circuit to control the second switching circuit to be turned OFF when a current, flowing through the second switching circuit when discharging the second capacitor, exceeds a current threshold.

* * * * *